May 20, 1930.   L. Y. LASSITER   1,759,409
AUTOMATIC REMINDER
Filed April 17, 1926
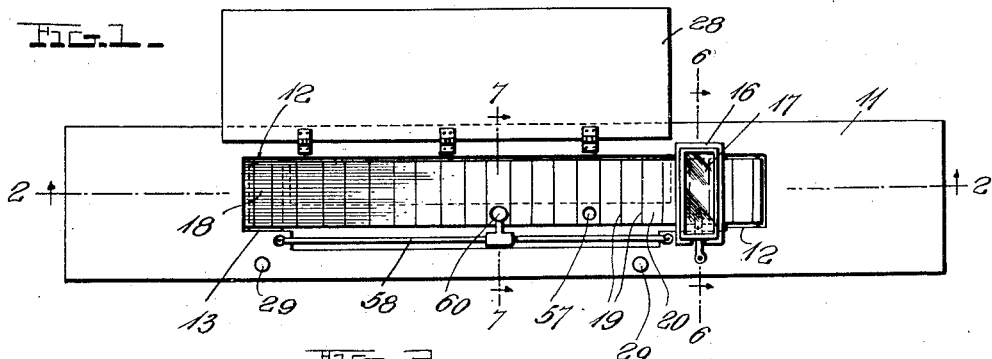
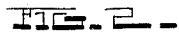
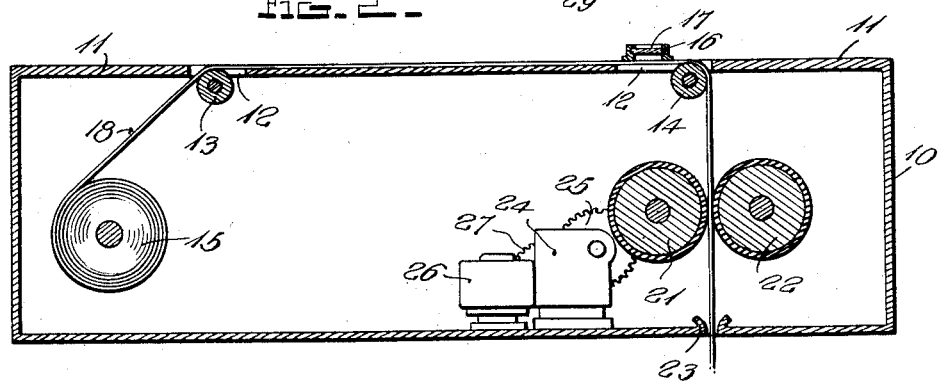
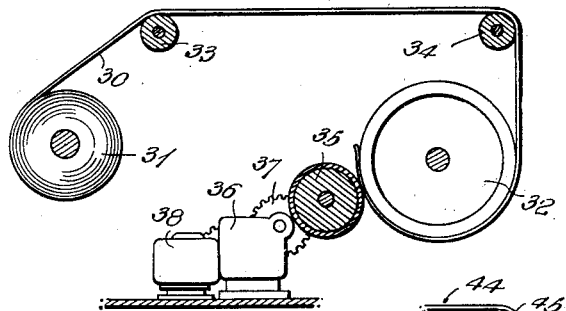
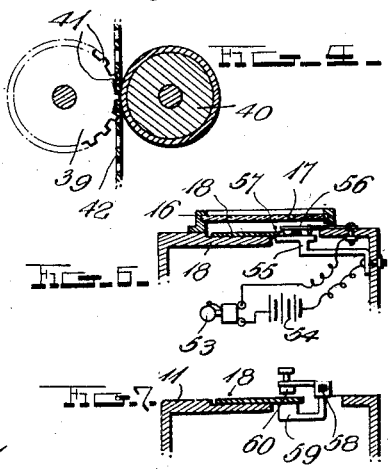
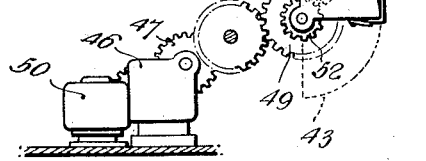
Inventor
Leon Y. Lassiter
By
Attorney Patented May 20, 1930

1,759,409

UNITED STATES PATENT OFFICE

LEON Y. LASSITER, OF TULSA, OKLAHOMA

AUTOMATIC REMINDER

Application filed April 17, 1926. Serial No. 102,756.

This invention comprehends the provision of a machine adapted to receive notations of matters about which the user desires to be reminded of in the future, and designed to perform this duty at the exact desired time.

In carrying out the invention, I contemplate the use of means having significance with regard to different periods of time, and adapted to have recorded thereon, with reference to some predetermined time in the future, the matter concerning which the user desires to be reminded of, so that when said predetermined period arrives, the matter will be brought to view at some particular part of the machine.

Another important object of the invention resides in the provision of an automatically operable signal utilized to direct the attention said means with a predetermined speed, so that said subject matter will be brought to view on the machine at the exact time desired.

Another object of the invention resides in the use of time controlled mechanism for operating the signal at a pretermined time in the future for the purpose above specified.

The invention further comprehends means having indicia thereon indicative of different periods of time, and upon which the subject matter to be reminded of is recorded with reference to a particular period or periods, and time controlled mechanism to operate said means with a predetermined speed, so that said subject matter will be brought to view on the machine at the exact time desired.

I also contemplate the use of a time controlled spring motor for operating the indicia carrying means, together with means for automatically rewinding the motor at predetermined periods.

A further object of the invention resides in the provision of a signal included in a normally open circuit, with means operable at a predetermined time for making and breaking said circuit, whereby the signal is operated for an appreciable length of time when the subject matter to be reminded of has been brought to a position on the machine to be viewed.

Other objects and advantages will appear from the following detail description when taken in connection with the accompanying drawings, the invention residing in the construction, combination and arrangement of parts as claimed.

In the drawings forming part of this application like numerals of reference indicate similar parts in the several views and wherein:

Figure 1 is a plan view of a machine constructed in accordance with one embodiment of the invention.

Figure 2 is a central vertical sectional view taken on line 2—2 of Figure 1.

Figure 3 is a view of a modification of the feed mechanism for the movable tape.

Figure 4 is a similar view of another modification.

Figure 5 is another modification of feed mechanism for the movable tape.

Figure 6 is a sectional view on line 6—6 of Figure 1.

Figure 7 is a sectional view on line 7—7 of Figure 1.

Referring now more particularly to the drawings, 10 indicates the casing or cabinet of the machine, which of course may be constructed of any suitable material, and vary in size and configuration without departing from the inventive idea. The top wall 11 of this casing is provided with spaced openings 12 which partly receive rollers 13 and 14 respectively for a purpose to be presently described. Journaled within the casing is a roller 15 adapted to support a roll of tape, and from which the tape is adapted to be unwound by a time controlled mechanism to be hereinafter described, the tape passing through the openings 12 above referred to and trained over the rollers 13 and 14 respectively. As shown in Figure 2, a portion of the tape travels over the upper wall of the casing, being exposed so that the notations of matter to be reminded of in the future can be conveniently recorded on the tape. Just before the tape passes over the roller 14, it passes beneath what I term a sight compartment arranged directly above one of the openings 12, and in this specific instance, consisting of flanges 16 between which is supported a vision or sight glass 17.

The tape 18 is constructed to bear significance with regard to different periods of time, and the matter desired to be reminded of in the future is adapted to be recorded on the tape with reference to some particular period or periods of time. For this purpose the tape is preferably divided by score lines 19 into a plurality of sections 20, each section being provided with indicia relative to some particular period of time. The manner in which the various sections are so timed depends upon the speed with which the tape is moved beneath the sight compartment above referred to, and this of course is regulated by a time controlled mechanism to be presently described.

In accordance with one embodiment of the invention this mechanism includes a pair of friction rollers 21 and 22 respectively, between which the tape is gripped and gradually unwound thereby from the roller 15. The tape preferably passes through an opening 23 in the bottom of the casing 10, and after passing through said opening can be destroyed or kept for further use as desired. A spring motor indicated generally at 24 is arranged within the casing and includes a gear 25 which operates the adjacent friction roller 21 as clearly illustrated in Figure 2, the speed of this motor 24 being regulated by a clock mechanism indicated generally at 26 and including a small gear 27 which meshes with the gear 25 of the motor.

In use of this form of the invention the matter desired to be reminded of in the future is recorded upon the tape 18 with reference to some particular period of time, the tape being gradually moved beneath the sight compartment by the mechanism just described. For example, the tape may be ruled or divided by the lines 19 into one inch sections 20, each section representing thirty minutes of time. Now suppose a person using the machine makes an engagement at eight o'clock in the morning for four o'clock in the afternoon, and desires to be reminded of the engagement at three-thirty. The section 20 of the tape directly under the vision glass 17 of the sight compartment is marked eight o'clock, and each of the other sections is correspondingly marked, adding thirty minutes of time to each section in consecutive order in the direction of the roller 13. The matter desired to be reminded of is then noted upon the particular section of the tape designated at three-thirty, and the machine put into operation. The feed mechanism for the tape is regulated to move the latter one inch in thirty minutes, so that the matter noted on the section designated three-thirty will be brought to view beneath the vision glass 17 exactly at that time. After the matter has been recorded upon the tape a cover 28 with which the machine is provided is closed to protect the tape from dust or other foreign matter, although the cover is held slightly spaced from the tape so as not to interfere with its movement by means of spaced stops 29 upon which the cover reposes. This cover of course may be hinged as shown or arranged to open and close in any other suitable manner.

In Figure 3 I have shown a slight modification of the feed mechanism for the tape, wherein the tape 30 when unwound from the roller 31 is wound about a larger roller 32, the tape of course passing over smaller rollers 33 and 34 respectively. The roller 32 is operated by a friction roller 35 which in turn is rotated through the instrumentality of a spring motor 36 including the gear 37. This spring motor is timed to feed the tape through the machine at a desired speed by means of a clock mechanism indicated generally at 38. The free end of the tape is of course initially secured to the roller 32 about which it is wound as it unwinds from the roller 31. In practice roller 32 is mounted in spring-pressed or other suitable bearings (not shown) adapting it to yield away from the driving surface of roll 35 on successive rotations as the tape winds thereon.

In Figure 4 I have shown another slight modification of the feed mechanism, wherein one of the feed rollers 39 and 40 respectively is provided with teeth 41 which are received by openings or perforations 42 arranged along one of the edges of the tape.

In Figure 5 I have shown a still further modified construction of the tape feed mechanism which includes a segment 43 to which the free end of the tape 44 is adapted to be attached, after being passed over a guide roller 45. This segment is adapted to move in an arc, being operated by a spring motor indicated generally at 46 and including a gear 47 which meshes with a gear 48, the latter in turn meshing with the gear 49 as shown. This last mentioned gear is carried by the shaft supporting the segment 43, the initial position of the latter being indicated by full lines in Figure 5. The speed with which this segment is operated is also controlled by a clock mechanism indicated generally at 50. Carried by the segment 43 is a pawl 51 which moves over a ratchet wheel 52 as the segment moves from its initial position to the position indicated by dotted lines in Figure 5, holding the segment against return movement until the pawl is released.

Now, when the subject matter to be reminded of is brought to view beneath the vision glass 17, a signal is automatically operated to direct the attention of the person to the machine. While this signal may be of any suitable type, it is included in a normally open circuit, the latter being closed at a predetermined period for the purpose specified. In accordance with this embodiment of the invention I have shown a signal 53 (Fig. 6)

included in a circuit with the source of current indicated at 54. This circuit also includes a switch arranged within the sight compartment and including a fixed contact 55 and a relatively movable resilient contact 56. These contacts 55 and 56 respectively are arranged at opposite sides of the tape which hold the movable contact spaced from the fixed contact as will be readily understood. In order to close the circuit to the signal 53 at a predetermined period of time, the particular section 20 of the tape designated by said predetermined period of time is provided with an opening 57 to allow the movable contact 56 under its own resiliency to move into engagement with the fixed contact, when that particular section of the tape arrives at the position directly beneath the vision glass 17. The signal is then automatically operated, and continues in operation for an appreciable length of time. How long the signal continues in operation largely depends upon the size of the opening 57, because the signal operates until the tape separates the movable contact from the fixed contact as will be readily understood.

In order that any section of the tape may be easily and quickly provided with an opening 57 for the purpose just stated, I employ a punch mounted to slide upon a suitable bar 58 arranged upon the machine as shown in Figure 1. This punch includes a fixed jaw 59 which slides beneath the tape, and a movable jaw 60 arranged directly above the tape but slightly spaced therefrom so that the punch in its entirety can be quickly arranged along any part of the tape. Then by simply depressing the movable jaw 60 of the punch the opening 57 is provided in that section of the tape upon which the notation of the matter to be reminded of is also recorded.

While it is believed that from the foregoing description the nature and advantages of the invention will be readily apparent, I desire to have it understood that I do not limit myself to anything herein shown and described, and that such changes in the construction and arrangement of parts may be resorted to when desired as fall within the scope of what is claimed.

What I claim is:

In an automatic reminder, a cabinet having a top provided with spaced openings, a traveling tape movable from within the cabinet to the outside thereof through one of said openings and across the top of the cabinet to the other opening and thence through the latter-named opening back into the cabinet, said tape being divided into sections of equal dimensions, each having indicia indicative of a particular period of time, a guide extending along the portion of the tape lying over the surface of the cabinet top between said openings, and a perforator movable along said guide and operative for perforating any division of the tape exposed between the openings.

In testimony whereof I affix my signature.

LEON Y. LASSITER.